Patented July 31, 1951

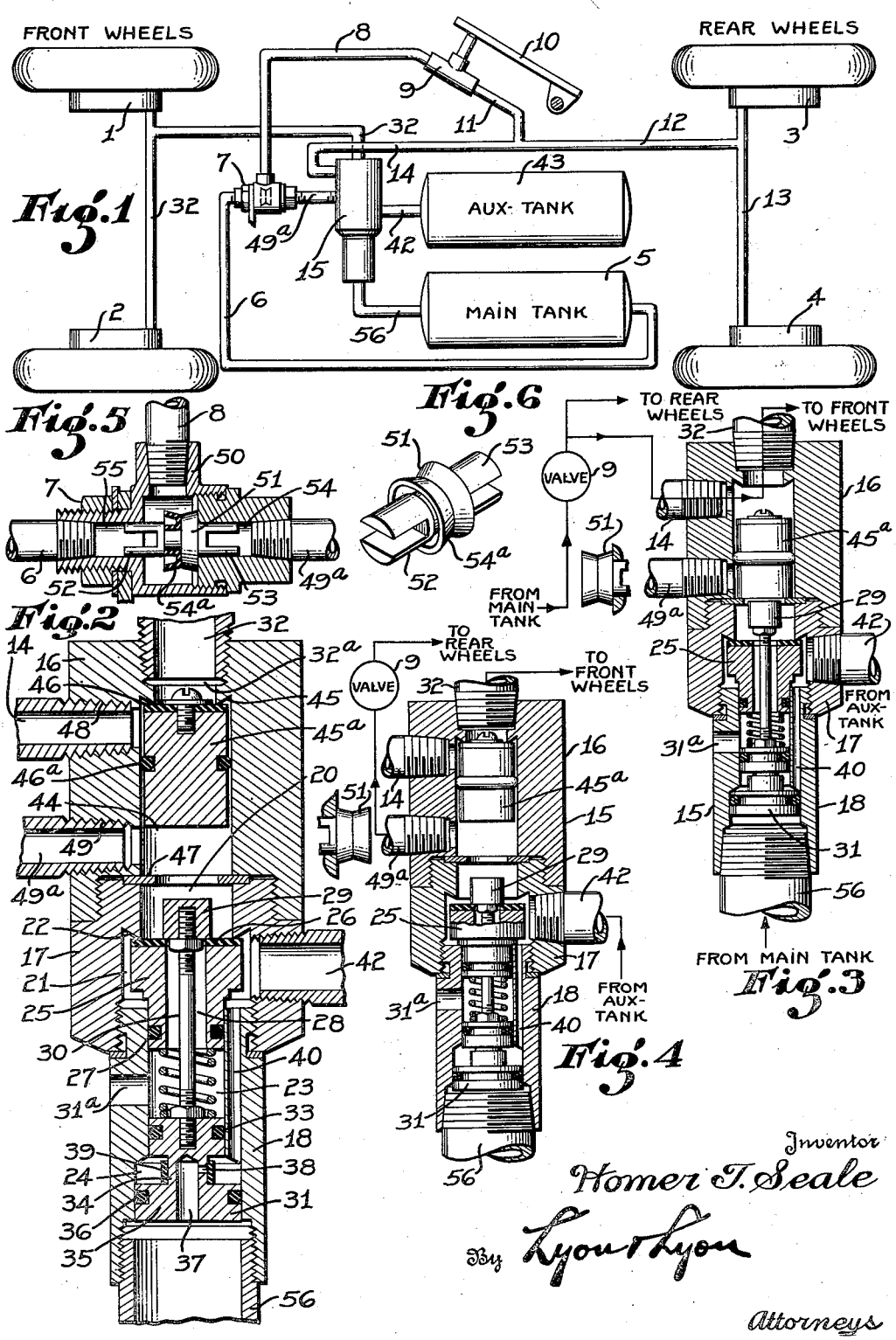

2,562,370

UNITED STATES PATENT OFFICE 2,562,370

SAFETY BRAKE CONTROL

Homer T. Seale, Los Angeles, Calif., assignor to Homer T. Seale, Inc., Los Angeles, Calif., a corporation of California Application July 2, 1949, Serial No. 102,897

14 Claims. (Cl. 188—152)

1

This invention relates to a pneumatic brake apparatus of a type providing brakes for each of the wheels of a four-wheel vehicle.

The present invention is particularly useful as a braking system for use on large buses and trucks. The braking systems now employed on large buses and trucks have a common source of air supply leading through a common valve system through lines to brakes on each of the four wheels of such buses or trucks. In case any of the lines leading to the brakes become severed in operation the pressure in the entire system is lost and the brake system is incapacitated. In the operation of four-wheel vehicles, particularly large buses and trucks through some shock to the front end of said vehicles, the air lines to the front wheel brakes become severed with the result there is no braking system left effective and the vehicle is out of control. Frequent damage to both the apparatus and human life have followed such severing or damage to the air lines leading particularly to the front wheels of such vehicle.

It is a general object of the present invention to provide a brake apparatus so constructed and arranged that the severing of the air lines to the front wheel brakes cannot incapacitate the system, the system remaining effective for at least applying the brakes to the rear wheels.

In the apparatus of the present invention there is employed the usual main tank which is connected to a brake valve which controls the flow of fluid to the front and rear wheels of the braking system. There is also included a control device which is in the line leading from the brake valve to the front wheels, which control device is also connected to the main tank. This said control device includes valve means which is under control of fluid pressure from the main tank. When fluid pressure exists in the main tank this valve means connects a passage through the control device which allows the flow of fluid from the brake valve to the front wheel brakes upon operation of said brake valve. In this position also the control device controls the charging of an auxiliary tank with fluid from the main tank. On loss of pressure in the main tank the valve means of this control device are effective for shutting off the front wheel brakes and lines leading direct from the brake valve and are effective for connecting the auxiliary tank to the upstream side of the brake valve. The connection is made through a two-way check valve so that the pressure in the auxiliary tank may be applied through the regular brake

2 valve to control the rear wheel brakes while both the front wheel brakes and the main tank are cut out of the system. This change has been effected automatically and leaves the brake system still under control of the same brake valve used in normal operation. Accordingly with the apparatus of the present invention loss of pressure from the main tank does not incapacitate the braking system. Damage to the lines leading to the front wheel brakes no longer incapacitate the rear wheel brakes which are effective as long as the pressure supply remains in the auxiliary tank.

The pneumatic brake apparatus of the present invention, together with other objects and advantages of the invention, will be more fully apparent from the following description of a preferred example of a pneumatic brake apparatus embodying the invention. The description is given in connection with the accompanying drawings in which:

Figure 1 is a somewhat diagrammatic plane view of the apparatus;

Figure 2 is an enlarged view mainly in vertical section of the flow control device;

Figure 3 is a similar view on somewhat smaller scale showing the normal operating position of the control device;

Figure 4 is a similar view showing the operating position of the device whenever, through accident, pressure has been lost in the main source of supply or main tank of the system;

Figure 5 is a sectional view of a double-check valve employed in the system; and Figure 6 is a perspective view of one of the elements of the check valve of Figure 5.

Referring to the drawings, I and 2 indicate the pneumatic brakes of the front wheels of the vehicle, and 3 and 4 indicate the pneumatic brakes of the rear wheels of the vehicle. The apparatus of the present invention comprises a main tank 5 or main source of pressure for the system. As is the usual practice, such main tank 5 in operation of the vehicle will be charged from a pump (not shown) driven by a motor (not shown) of the vehicle. The main tank 5 is shown as connected by a line 6 leading to a double-check valve 7, from which the line 8 leads to a brake valve 9. The brake valve 9 is but diagrammatically indicated as it may be any usual or customary valve employed for controlling the brakes of a vehicle to a pneumatic system and is most commonly operated by the brake pedal as is indicated at 10. The valve 9 is intended to control the application of air pressure from line 8 to line 11, and in the closed position to exhaust pressure from line 11 in accordance with the usual practice. Line 11 connects to lines 12 and 13 leading to the rear wheel brakes 3 and 4, and also connects with line 14 which leads to the control device 15. The control device 15 comprises an upper body member 16, an intermediate body member 17 threaded thereto, and a lower body member 18 threaded to the intermediate body member 17. The intermediate body member 17 is indicated as having a bore 20 which is enlarged at 21, there being a downwardly facing valve seat 22 provided at the enlargement of the bore. The lower body member 18 has a bore 23 which is enlarged as indicated at 24 at the lower end.

The control device also includes a valve member 25 which is intended, as hereinafter described, to be movable in two directions in the bores of the body under the influence of pneumatic pressure. This valve member 25 preferably includes a packing 26 on its upper enlarged end, which packing 26 is movable into engagement with the valve seat 22. The member 25 is provided with a reduced end guided within the bore 23 and sealed thereto by the packing ring 27. A passage 28 is provided axially through the member 25 and the opening and closing of said passage is controlled by a valve head 29. The valve head 29 is attached by the rod 30 to a plunger and valve member 31. Between the member 25 and the member 31 there is provided an outlet port 31a connecting with the bore 23 of the lower body member 18, which, as hereafter explained, operates as an exhaust port.

The member 31 has an upper portion guided in the bore 23 and seals thereto by the ring 33. It has a reduced section 34 and an enlarged end 35 guided for movement in the bore 24 and sealed therewith by the ring 36. From the lower end of the member 31 a bore 37 leads to a small radial passage 38, which is normally covered by an elastic band 39 which serves as a check valve for controlling the flow of fluid from the bores 37 and 38 to the space of bore 24 around the reduced section 34 of the member 31. This space is connected with a vertical bore 40 to the bore 21 and hence leads to a line 42 which connects to an auxiliary tank 43.

The upper body member 16 is provided with a bore 44 which is reduced so as to provide the shoulder 45 which is intended to operate as a valve seat. Within the bore 44 there is provided a shuttle valve member 45a the upper side of which is provided with a packing face 46 intended for engagement with the seat 45. Near the lower end this shuttle valve member is provided with a packing ring 46a for sealing with the bore 44. There is provided a stop-ring 47 between the upper body 16 and the lower body member 17 for limiting the downward movement of the shuttle valve 45a. The upper body member is provided with a threaded inlet 48 connected to the line 14. The upper body member is also provided with a threaded outlet 49 connected with a line 49a leading to the check valve 7. The upper body member 17 is further provided with a threaded outlet 32a connected to the line 32 leading to the front wheel brakes 1 and 2.

Referring to Figures 5 and 6 the two-way check valve comprises a valve body 50 in which is mounted the valve member 51. This valve member 51 has two opposite slotted stems 52 and 53 which are movable respectively in the bores 54 and 55 leading respectively to lines 6 and 49a. Between the stems 52 and 53 there is provided the packing head 54a. With such a valve when pressure is applied from the line 6 the head is forced in position to close the bore 54 and allow the flow of air only from line 6 to line 8. Whenever the pressure on the line 6 drops and pressure is imposed from line 49a, the member 51 is moved to the left from the position shown in Figure 5 so as to open the bore 54 and close the bore 55 thereby shutting off line 6 and connecting line 49a with line 8.

In operation of the apparatus of the present invention normally pressure from the main tank 5 is applied through a line 56 connected to the lower body member 17. This imposes pressure on the lower face of the plunger member 31 which forces said member upwardly until the member 25 engages the seat 22. Valve member 31 continues to rise lifting the valve head 29 from the exhaust passage 28. In this position the line 42 leading to the auxiliary tank 43 is shut off from the bore 20 above the valve seat 22. The pressure from the main tank enters by the sleeve valve 39 through passages 40 in order to charge the auxiliary tank 43 to a pressure substantially equal to that of the main tank 5. With the bore 20 thus connected to the outlet port 31a there is no pressure below the shuttle valve member 45a which is now in the lower position, the apparatus being in the position indicated in Figure 3. The pressure from the main tank 5 is also applied through line 6 to the double-check valve 7 forcing valve member 51 in position to connect lines 6 and 8 and to shut off line 49a. The pressure from the main tank is thus applied through line 8 to the valve 9 and on operation of this valve by the usual brake lever 10 the pressure is applied through line 12 to the rear wheel brakes 3 and 4. Likewise the pressure is applied through line 14 into the bore of the upper body member 16 above the shuttle valve 45a and hence through the outlet 32a to line 32 to the two front wheel brake applicators 1 and 2.

In case line 32 becomes open so that operation of valve 9 should cause a pressure of the main tank to become exhausted, pressure is removed from the bottom of plunger 31 of the control member 15. This member then drops to the position shown in Figure 4. In so moving the head 29 first closes the exhaust passage 28 whereupon further movement of the head 29 moves the valve member 25 to disengage the seat 22. This downward movement is facilitated by the application of pressure from the auxiliary tank 43 against the upper face of the packing 26 and against the enlarged end of the plunger member 31. In this position of the apparatus pressure from the auxiliary tank 43 against the lower face of the shuttle valve member 45a forces that member into the upper position. In this position line 32 leading to the front wheel brakes is disconnected from line 14 leading from the valve 9. Also in this position pressure is applied to a line 49 from the auxiliary tank 43 which forces the valve member 51 of the double-check valve 7 to the left as viewed in Figure 5 and connects line 49a to line 8. In this position of the apparatus, therefore, the main tank 5 and the front wheels have been cut out of the system. The auxiliary tank 43 is now connected to the valve 9 and on operation of this valve the pressure from this tank may be applied to operate the rear wheel brakes.

The apparatus of the present invention thus provides the means by which there is still available through the operation of the same braking lever a valve air pressure for actuating the rear wheel brakes of the system even when pressure from the main tank has been exhausted, such as by a severing of the lines leading to the front wheel brakes.

The apparatus of the present invention is thus able to prevent serious accidents such as have occurred in the past to large trucks, buses, etc. due to failure of the braking system.

While the particular form of the apparatus herein described is well adapted to carry out the objects of the invention, various modifications and changes may be made and this invention is of the scope set forth in the appended claims.

I claim:

1. In a brake system of the class described, the combination of a main pressure tank, a brake valve connected to said tank, and two sets of brakes controlled by said valve, of a control device connected to said main tank, said control device including valve means movable by pressure from said main tank to one operating position, and movable on loss of pressure from said main tank to a second operating position, said valve means being operative in said first position to permit the flow of fluid from said main tank to said auxiliary tank and to permit the flow of fluid from said brake valve to both sets of said wheel brakes, said valve means being operative in the second position to stop the flow of fluid from said brake valve to one set of brake means and to connect said auxiliary tank to said brake valve to permit the second set of brakes to be controlled by said valve.

2. In a brake system of the class described, the combination of a main fluid tank, a brake valve connected to said tank and front and rear wheel brakes connected to said valve, of a control device also connected to said main tank and to said brake valve, and an auxiliary tank connected to said control device, said control device including valve means movable by pressure from said main tank to one operating position and movable on loss of pressure from said main tank to a second operating position, said valve means being operative in the first position to permit the flow of fluid from said main tank to said auxiliary tank, and to allow flow of fluid under control of said brake valve from said brake valve to the front and rear wheel brakes, said valve means being operated in the second position to stop the flow from the brake valve toward the front wheel brakes, said valve means being also operative in the second position to connect said auxiliary tank to said valve means to allow the flow from said auxiliary tank of fluid under the control of said brake valve to the rear wheel brakes.

3. In a brake system of the class described, the combination with a main fluid pressure tank, a brake valve connected to said tank, and front and rear wheel brakes connected to said brake valve, of a control device in the connection between the brake valve and the front wheel brakes, said control device being operative to shut off the front wheel brakes from the brake valve on loss of pressure in the main tank, an auxiliary tank, said control device being operative for connecting said brake valve to said auxiliary tank to allow actuation of the rear wheel brakes, the control device acting to so connect said auxiliary tank to said brake valve on loss of pressure from said main tank.

4. In a brake system of the class described, the combination with a main tank, a brake valve connected to said tank, and front and rear wheel brakes connected to said brake valve, of a control device in the connection from said brake valve to the front wheel brakes, said control device being connected to said main tank, and including a valve control means actuated by loss of pressure in said main tank for shutting off said front wheel brakes from said brake valve, an auxiliary tank, said control device including valve means actuated by loss of pressure in said main tank for connecting said auxiliary tank to said brake valve, said connection including a two-way check valve.

5. In a brake system of the class described, the combination with a main pressure tank, a two-way check valve connected to said main tank, a brake valve connected to said two-way check valve, and front and rear wheel brakes connected to said brake valve, of a control device in the connection between said brake valve and the front wheel brakes, said control device being connected to said main tank and to said two-way check valve, an auxiliary tank connected to said control device, said control device including valve means actuated by loss of pressure from said main tank for shutting off the front wheel brakes from the brake valve, and connecting said auxiliary tank to said two-way check valve.

6. In a brake system of the class described, the combination with a main pressure tank, a two-way check valve connected to said main tank, a brake valve connected to said two-way check valve, front and rear wheel brakes connected to said brake valve, of a control device in the connection between said brake valve and the front wheel brakes, said control device being connected to said main tank and to said two-way check valve, an auxiliary tank connected to said control device, said control device including a valve means actuated by loss of pressure from said main tank for shutting off the said front wheel brakes from the brake valve, and connecting said auxiliary tank to said two-way check valve, said valve means including a shuttle valve member movable to shut off from the system the line connecting the front wheel brakes.

7. A control device for a four-wheel brake system which includes a main pressure tank, a brake valve, and an auxiliary tank, said control device including a valve means movable by the application of pressure to one operating position and movable on loss of pressure to a second operating position, the valve means in the first operating position closing off communication between said auxiliary tank and said brake valve, said control device including an exhaust port which is opened by said valve means in said first operating position, said valve means in the second operating position closing said exhaust port and opening the connection between said auxiliary tank and said brake valve, said control device including means to shut off the flow of pressure to certain wheel brakes in the second operating position of said valve means.

8. A control device for a four-wheel brake system which includes a main fluid tank, a brake valve, and an auxiliary tank, said control device including valve means movable by pressure from said main tank to one operating position and movable on loss of pressure from said main tank to second operating position, said valve means in the first position permitting flow of fluid from said main tank to said auxiliary tank and including a member moved to allow flow of fluid under control of said brake valve from the main tank to the front wheel brakes, said member in the second position stopping the flow from the brake valve to the front wheel brakes, said valve means including a member which in the second position opens a passage to permit flow of fluid from said auxiliary tank to said brake valve thereby to allow flow of fluid from said auxiliary tank to rear wheel brakes under control of said brake valve.

9. A control device for a four-wheel brake system comprising a movable valve member movable to close a passage and having an exhaust port therethrough, a plunger member connected to said movable valve member and movable for urging the valve member to the closed position, such plunger being movable in the opposite direction to close said exhaust port and move said valve member to the open position, and a shuttle valve member movable in the passage controlled by said movable valve member.

10. A control device for a four-wheel brake system which comprises a body having an inlet and an outlet, a movable valve member for opening and closing a passage connecting said inlet and outlet, an exhaust port below said movable valve member, a valve member for closing said exhaust port, a pressure actuated member for moving said valve member to uncover said port on application of pressure and for closing said port on release of pressure, a movable valve member also connected to said plunger and movable to closed position by said plunger on application of pressure thereto.

11. A control device for a brake system which comprises a body having a main bore, a lateral port connected to said main bore at one end thereof, a shuttle valve member movable in said bore to close said lateral port in one position and to open the same in a second operating position, a second lateral port connecting the said bore below said shuttle valve in its closed position, a further lateral bore connected with said bore below the last mentioned lateral port, a movable valve member for closing said bore between said last two mentioned lateral ports, a plunger member movable in said bore for opening and closing said last mentioned valve member.

12. A control device for a brake system which comprises a body having a main bore, a lateral port connected to said main bore at one end thereof, a shuttle valve member movable in said bore to close said lateral port in one position and to open the same in a second operating position, a second lateral port connecting the said bore below said shuttle valve in its closed position, a further lateral bore connected with said bore below the last mentioned lateral port, a movable valve member for closing said bore between said last two mentioned lateral ports, a plunger member movable in said bore for opening and closing said last mentioned valve member, and a passage connected from said plunger to the last mentioned lateral port, said passage including a check valve.

13. A control device for a brake system which comprises a body having a main bore, a lateral port connected to said main bore at one end thereof, a shuttle valve member movable in said bore to close said lateral port in one position and to open the same in a second operating position, a second lateral port connecting the said bore below said shuttle valve in its closed position, a further lateral bore connected with said bore below the last mentioned lateral port, a movable valve member for closing said bore between said last two mentioned lateral ports, a plunger member movable in said bore for opening and closing said last mentioned valve member, said movable valve member having an exhaust port therethrough, and a valve head actuated by said plunger for controlling said exhaust port.

14. A brake system which includes the combination with a main tank, a brake valve connected to said tank, and front and rear wheel brakes connected to said brake valve, of a control device connected to said main tank, said control device including a plunger member actuated by pressure from said main tank to one operating position and movable on loss of said pressure to a second operating position, a movable valve member connected to said plunger, said movable valve member being in a passage connecting said auxiliary tank to said brake valve, and said movable valve member being closed and opened as the plunger moves from the first to the second operating position, and exhaust port in said control device, and means moved by said plunger for opening and closing said exhaust port, a shuttle valve disposed in said control device above said exhaust port and movable to open and close a passage connected to the said brake valve and the front wheel brakes.

HOMER T. SEALE.

REFERENCES CITED

The following references are of record in the file of this patent:

FOREIGN PATENTS

| Number | Country | Date |
| --- | --- | --- |
| 203,071 | Great Britain | Sept. 6, 1923 |